United States Patent
Qiao et al.

(10) Patent No.: US 7,457,032 B2
(45) Date of Patent: Nov. 25, 2008

(54) ARRANGEMENT, SYSTEM, AND METHOD FOR ACCURATE POWER MEASUREMENTS USING AN OPTICAL PERFORMANCE MONITOR (OPM)

(75) Inventors: Lijie Qiao, Ottawa (CA); Paul J. Vella, Ottawa (CA)

(73) Assignee: BTI Photonic Systems Inc., Ottawa, Ontario (CA)

( * ) Notice: Subject to any disclaimer, the term of this patent is extended or adjusted under 35 U.S.C. 154(b) by 57 days.

(21) Appl. No.: 11/231,874

(22) Filed: Sep. 22, 2005

(65) Prior Publication Data

US 2007/0065147 A1 Mar. 22, 2007

(51) Int. Cl.
*H04B 10/08* (2006.01)
*H04B 10/17* (2006.01)

(52) U.S. Cl. .......................... 359/333; 398/26; 359/483
(58) Field of Classification Search ................. 398/26; 359/333, 483
See application file for complete search history.

(56) References Cited

U.S. PATENT DOCUMENTS

| | | | | |
|---|---|---|---|---|
| 5,282,074 A * | 1/1994 | Miyazaki et al. | ............... | 398/26 |
| 5,295,015 A * | 3/1994 | Yoneyama | ................... | 359/333 |
| 5,654,816 A * | 8/1997 | Fishman | .................... | 359/349 |
| 5,696,707 A * | 12/1997 | Hentschel et al. | ............. | 702/69 |
| 5,969,834 A * | 10/1999 | Farber et al. | ................... | 398/34 |
| 6,268,943 B1 * | 7/2001 | Kang | ........................... | 398/26 |
| 6,344,910 B1 * | 2/2002 | Cao | ............................ | 398/34 |
| 6,603,902 B1 * | 8/2003 | So | ............................... | 385/37 |
| 6,791,685 B2 * | 9/2004 | Youn et al. | ................... | 356/327 |
| 6,847,440 B2 * | 1/2005 | Eberlein et al. | ............ | 356/73.1 |
| 7,130,505 B2 * | 10/2006 | Shen | ............................ | 385/24 |
| 2001/0026385 A1 * | 10/2001 | Cao | ............................ | 359/124 |
| 2002/0048062 A1 * | 4/2002 | Sakamoto et al. | ........... | 359/124 |
| 2002/0171889 A1 * | 11/2002 | Takeuchi et al. | ........... | 359/124 |
| 2002/0186467 A1 * | 12/2002 | Huang et al. | ................ | 359/484 |
| 2003/0072006 A1 * | 4/2003 | Gu | ............................... | 356/491 |
| 2003/0090755 A1 * | 5/2003 | Chung et al. | ................ | 359/110 |
| 2003/0160963 A1 * | 8/2003 | Gu | ............................... | 356/491 |
| 2003/0219250 A1 * | 11/2003 | Wein et al. | ..................... | 398/26 |
| 2004/0096212 A1 * | 5/2004 | McLeod et al. | ............... | 398/25 |
| 2004/0135993 A1 * | 7/2004 | Eberlein et al. | ............ | 356/73.1 |
| 2004/0160596 A1 | 8/2004 | He et al. | ..................... | 356/73.1 |
| 2006/0067686 A1 * | 3/2006 | Gottwald et al. | .............. | 398/26 |
| 2006/0233552 A1 * | 10/2006 | Eder et al. | ..................... | 398/94 |
| 2007/0196110 A1 * | 8/2007 | Mikkelsen et al. | .......... | 398/140 |

\* cited by examiner

*Primary Examiner*—Jack W Keith
*Assistant Examiner*—Ari M Diacou

(57) ABSTRACT

An arrangement has a WDT (Wavelength-Dependent Tap) coupled in an OCS (Optical Communication System) and an OPM (Optical Performance Monitoring) function coupled to the WDT. The WDT is adapted to receive from the OCS an input optical signal having noise and channels at respective channel wavelengths. The WDT couples to an output some of the input optical signal at the channel wavelengths and most of a noise power at wavelengths between the channel wavelengths, and couples a remaining portion of the input optical signal back into the optical communication system. The optical performance monitoring function determines a power characteristic of the input optical signal as a function of a power from the output. The power characteristic may be an OSNR (Optical Signal-to-Noise Ratio) determined as a function of a signal power and a noise power of the output optical signal.

16 Claims, 12 Drawing Sheets

US 7,457,032 B2

ARRANGEMENT, SYSTEM, AND METHOD FOR ACCURATE POWER MEASUREMENTS USING AN OPTICAL PERFORMANCE MONITOR (OPM)

FIELD OF THE INVENTION

The invention relates to OSNR (optical signal to noise ratio) measurements in optical systems using an optical performance monitor.

BACKGROUND OF THE INVENTION

Conventional CPMs (Channel Performance Monitors), or OPM (Optical performance Monitors) as they are sometimes called, are used to measure optical power in DWDM (Dense Wavelength-Division-Multiplexing) optical signals. Monitoring of performance is becoming more important, and some CPMs also measure signal power and are used for measuring OSNR (Optical Signal-to-Noise Ratio) in DWDM optical systems. However, such devices suffer from their inability to measure OSNR accurately when the OSNR is greater than about 15 dB. In particular, to determine OSNR in a DWDM optical signal these devices measure signal power at channel wavelengths and a noise level at wavelengths between the channel wavelengths. However, the noise level measured includes crosstalk from adjacent channels. Furthermore, for purposes of monitoring, conventional systems make use of a 1% optical tap to obtain 1% of the power of the DWDM optical signal. This means that very little noise from the DWDM optical signal is tapped for purposes of measurements. If the noise tapped from the DWDM optical signal is below the noise floor of the monitor, it will not be possible to obtain an accurate measurement.

One improvement is to replace the 1% optical tap with a 2% optical tap to increase the power to the CPM by 3 dB. However, tapping a larger percentage of the power of the DWDM optical signal for measurements results in an increase in optical-system loss during optical performance monitoring. Furthermore, crosstalk related errors are not addressed.

By way of background, a conventional arrangement used for measuring OSNR will now be described with reference to FIGS. 1 and 2. In FIG. 1, a 1% optical tap 110 is coupled to an optical amplifier 120 and to a CPM 130. An optical signal 140 is input into the 1% optical tap 110. The 1% optical tap 110 couples 99% of the power of the optical signal 140 to the optical amplifier 120 for amplification. In particular, 99% of the power over an entire wavelength spectrum of the optical signal 140 is coupled to the optical amplifier 120 by way of output optical signal 150. The 1% optical tap 110 also couples 1% of the power of the optical signal 140 to the CPM 130 for measuring OSNR. In particular, 1% of the power over the entire wavelength spectrum of the optical signal 140 is coupled to the CPM 130 by way of output optical signal 160.

The accuracy in the noise measurement is compromised when the output optical signal 160 contains a component of noise from the optical signal 140, which has a power that is less than or close to the noise floor of the CPM 130. This, in turn, compromises the accuracy in determining the OSNR. For example, in FIG. 2 a curve 210 represents the power of the optical signal 160 plotted as a function of wavelength, and a curve 220 represents the noise floor plotted as a function of wavelength. The curve 210 shows a noise level of approximately −50 dBm at wavelengths between channel wavelengths 240 of the optical signal 160. The curve 220 shows a higher noise floor of approximately −46 dBm due to the CPM 130. Since the noise floor is higher than the actual noise of the output optical signal 160, existing CPMs cannot accurately measure the OSNR. The problem is exacerbated by the crosstalk problem. Conventional CPMs use a tunable filter that captures energy in a range of wavelengths. An example filter response is indicated at 245 shown tuned to a noise wavelength. Almost all energy gets captured at the centre wavelength, this being tunable. However it can be seen that when the frequency is selected to be between two channel wavelengths as shown, a significant part of the adjacent channel power is also captured making the noise power readings highly inaccurate.

SUMMARY OF THE INVENTION

An arrangement has a WDT (Wavelength-Dependent Tap) coupled to an optical performance monitoring function. In some embodiments of the invention, the optical performance monitoring function forms part of an OPM (Optical Performance Monitor) or a CPM (Channel Performance Monitor) coupled to the WDT. In some embodiments of the invention, the WDT forms part of an OPM or a CPM. The WDT is coupled in an optical communication system. The WDT receives from the optical communication system an input optical signal having background noise and channels at respective channel wavelengths. The WDT couples to a first output some of the input optical signal at one or more of the channel wavelengths and most of the input optical signal at one or more wavelengths between the respective channel wavelengths. The WDT also couples a remaining portion of the input optical signal back into the optical communication system through a second output. The optical performance monitoring function determines the power characteristic of the input optical signal using the power from the first output.

Most of the noise power at wavelengths between the channel wavelengths is coupled to the first output to produce a tapped signal for monitoring. As such, the tapped signal can have a noise level that is higher than the noise floor of the optical monitoring function, and an accurate noise power measurement can be made. At the same time, a low loss is maintained in a through signal that is fed back into the optical communication system by using only a small amount of the power at the channel wavelengths for purposes of monitoring.

In some embodiments of the invention, the power characteristic is an OSNR (Optical Signal-to-Noise Ratio) of the input optical signal, and the optical performance monitoring function determines the OSNR as a function of a signal power from the first output at one or more of the channel wavelengths and a noise power from the first output at one or more wavelengths between the channel wavelengths.

Since most of the noise power at the wavelengths between the channel wavelengths is used in the determination of the OSNR, a sufficient level of noise can be tapped to obtain a noise sample that is above the noise floor of the optical monitoring function for accuracy in noise power measurements. This, in turn, provides an accurate determination of OSNR in optical signals having OSNRs as high as 40 dBm. Furthermore, since channel wavelengths are attenuated, the crosstalk problem is mitigated.

According to one broad aspect, the invention provides arrangement comprising: a WDT (wavelength-dependent tap) for receiving an input optical signal having noise and a plurality of channels at respective channel wavelengths, the WDT having a first output and a second output and being adapted to: i) couple to the first output some of the input optical signal at the channel wavelengths and most of the input optical signal at wavelengths between the channel wavelengths; and ii) couple a remaining portion of the input optical signal to the second output; and an optical performance monitoring function for determining an OSNR (Optical Signal-to-Noise Ratio) of the input optical signal as a function of a signal power from the first output of at least one of the channel wavelengths and a noise power from the first output of at least one wavelength between the channel wavelengths.

According to another broad aspect, the invention provides a method comprising: receiving an input optical signal having noise and a plurality of channels at respective channel wavelengths; coupling to a first output some of the input optical signal at the channel wavelengths and most of the input optical signal at wavelengths between the channel wavelengths; and coupling a remaining portion of the input optical signal to a second output; and determining an OSNR (Optical Signal-to-Noise Ratio) of the input optical signal as a function of a signal power from the first output of at least one of the channel wavelengths and a noise power from the first output of at least one wavelength between the channel wavelengths.

According to another broad aspect, the invention provides an optical communication system comprising: an input optical communication line; an output optical communication line; a WDT (wavelength-Dependent Tap) having a first output and a second output and being coupled to the input optical communication line for receiving from the input optical communication line an input optical signal having noise and a plurality of channels at respective channel wavelengths, the WDT being coupled to the output optical communication line at the second output and being adapted to: i) couple to the first output some of the input optical signal at the channel wavelengths and most of the input optical signal at wavelengths between the channel wavelengths; and ii) couple a remaining portion of the input optical signal to the output optical communication line through the second output; and an optical performance monitoring function for determining a power characteristic of the input optical signal as a function of a power from the first output.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
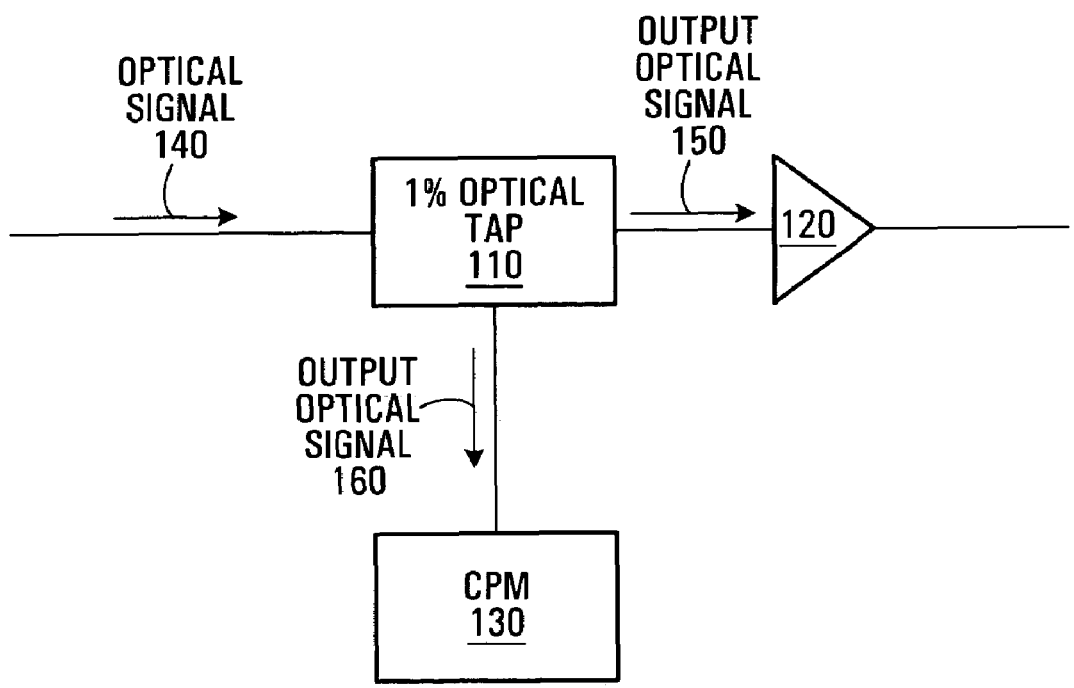
FIG. 1 is a block diagram of a conventional arrangement for determining an OSNR (Optical Signal-to-Noise Ratio) of an optical signal.
Figure 2:
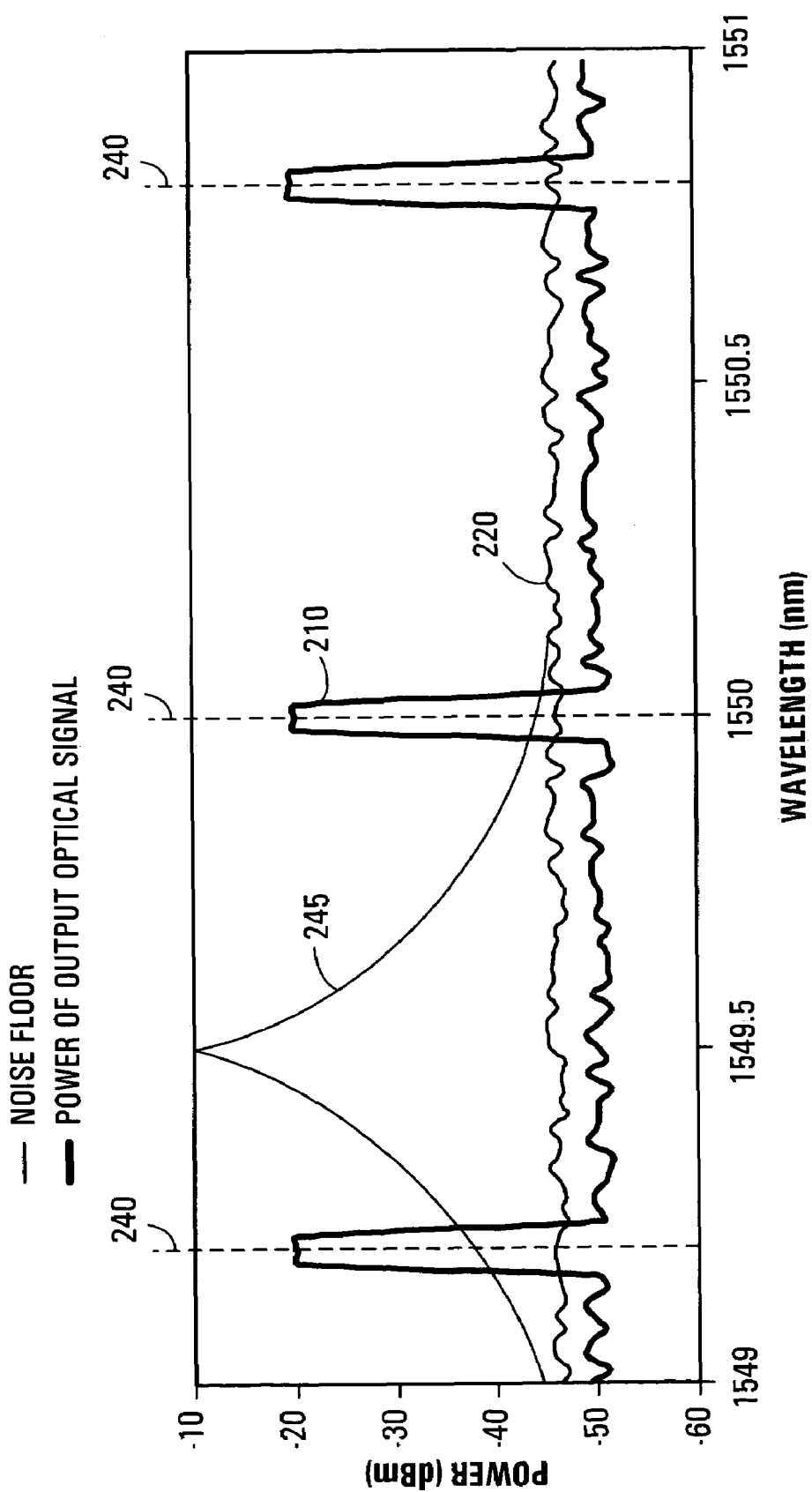
FIG. 2 is graph of the power of an optical signal being monitored using the arrangement of FIG. 1 and of an instrumental noise floor both plotted as a function of wavelength.

In embodiments of the invention a WDT (Wavelength-Dependent Tap) is employed that has transfer functions that allow some, preferably a small amount, of an optical signal at channel wavelengths and most of the optical noise between the channel wavelengths to be coupled to an output for measurement. In this way, sufficient noise power is tapped for accurate measurement of OSNR while tapping only a small easily measurable portion of channel power. An arrangement having such a WDT will now be described with reference to FIG. 3A. Shown is a block diagram of an arrangement for performing optical performance monitoring of an optical signal, in accordance with an embodiment of the invention. The arrangement is generally indicated by 300 and has a WDT (Wavelength-Dependent Tap) 310 having an input 320 and two outputs 330, 340. The WDT 310 is coupled inline between an input optical communication line 350 and an output optical communication line 370. An OPM (Optical Performance Monitor) 345 has an optical performance monitoring function 380 and is coupled to output 340 of the WDT 310.

During operation, an input optical signal 390 is received at the WDT 310. Output signals 305, 315 are produced at outputs 330, 340, respectively. Signal 315 will be referred to as a "tapped signal", and signal 305 will be referred to as a "through signal". The through signal 305 contains most of the signal power at channel wavelengths and is available for other purposes. In other words, the arrangement non-destructively processes the input optical signal 390. Preferably, the through signal 305 is passed on to a next component of an optical communication system, such as an optical amplifier (for example as shown in FIG. 3B at 360) and the tapped signal 315 is used to perform optical performance monitoring. The input optical signal 350 may have come from another optical component such as an amplifier (for example as shown in FIG. 3C at 365). The input optical signal 390 has noise and a plurality of channels at respective channel wavelengths. The WDT 310 couples some of the power of the input optical signal 390 at the channel wavelengths and most of the noise power of the input optical signal 390 at wavelengths between the channel wavelengths (i.e. where there is only noise) to output 340 to produce the tapped signal 315 for optical performance monitoring (including OSNR). The remaining portion of the input optical signal 390 is coupled to output 330 to produce the through signal 305. In this way, most of the noise at certain wavelengths is coupled to output 340 for optical performance monitoring while maintaining a low loss of power at the channel wavelengths of through signal 305.

A method of performing optical performance monitoring of the input optical signal 390 will now be described with reference to FIGS. 3A and 4. In FIG. 4, at step 410 the input optical signal 390 having noise and a plurality of channels at respective channel wavelengths is received from the input optical communication line 350. Some of the optical signal 390 at the channel wavelengths and most of the optical signal 390 at wavelengths between the channel wavelengths are coupled to the output 340 to produce tapped signal 315 (step 420). Furthermore, at step 420 a remaining portion of the input optical signal 390 is also coupled to the optical communication line 370 through the output 330 to produce through signal 305. At step 430 a power characteristic of the input optical signal 390 is determined as function of a power of tapped signal 315 from output 340.

In some implementations, the power characteristic includes an OSNR and the optical performance monitoring function 380 determines the OSNR of the input optical signal 390 as a function of both a signal power of the tapped signal 315 at one or more channel wavelengths and a noise power of the optical signal 315 at one or more wavelengths between the respective channel wavelengths.

In some embodiments of the invention, the WDT 310 is an interleaver. In some implementations, the input optical signal 390 has a 100 GHz channel spacing and the WDT 310 is a 50 GHz interleaver adapted to couple most of the power of the input optical signal 390 at all of the channel wavelengths (i.e. even interleaver outputs) to output 330 and adapted to couple most of the noise power at wavelengths between channel wavelengths to the output 340.

Figure 5A:
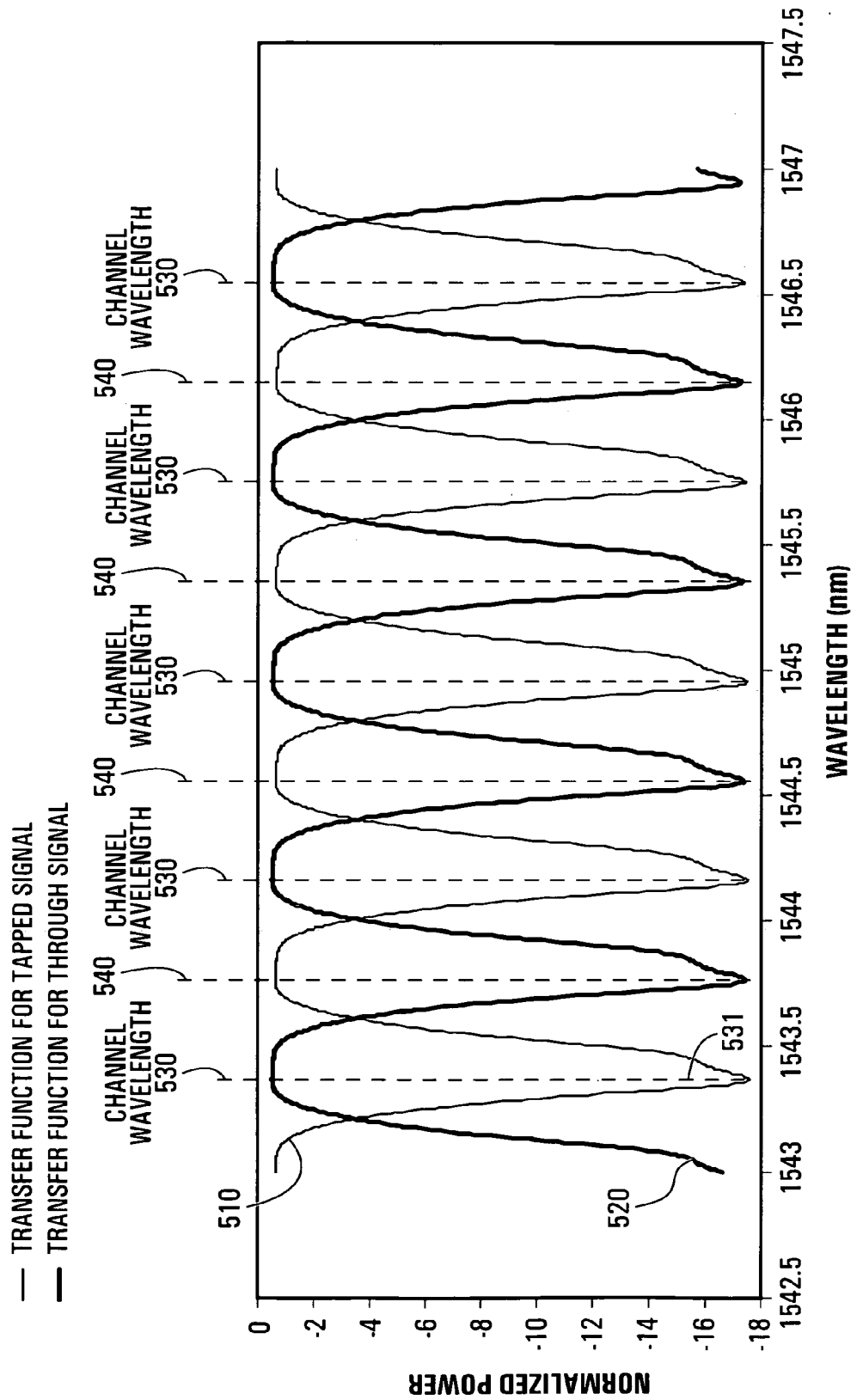
FIG. 5A is a graph of example transfer functions of the WDT (Wavelength-Dependent Tap) used in the arrangement of FIG. 3A and plotted as a function of wavelength.

More generally, the WDT 310 has a first periodic transfer function from input 320 to tapped output 340 that allows some of the power of the input optical signal 390 at the channel wavelengths and most of the noise power of the optical signal 390 at wavelengths between the channel wavelengths to be coupled to output 340. The WDT 310 has another periodic transfer function from input 320 to through output 330 that allows most of the power of the input optical signal 390 at the channel wavelengths 540 to be coupled to through output 330. FIG. 5A shows a pair of example transfer functions 510, 520 for a WDT implementation for output 340 (producing tapped signal 315) and output 330 (producing through signal 305), respectively. These transfer functions 510, 520 are measured for an optical interleaver having 50 GHz channel spacings. In the example implementation the input optical signal has channels at frequencies 190000 GHz, 190100 GHz, 190200 GHz, . . . and the WDT 310 couples most of the power at these frequencies to output 330. The WDT 310 also couples most of the power at frequencies 190050 GHz, 190150 GHz, 190250 GHz, . . . to output 340. The transfer function 510 has minima (valleys) at channel wavelengths 530, which correspond to the channel wavelengths of the input optical signal 390. The transfer function 510 allows some (approximately 1 to 2% in this example) of the power of the input optical signal 390 at the channel wavelengths 530 to be coupled to the output 340 for power measurements. The function 510 also has maxima at wavelengths 540 between the channel wavelengths 530 of the input optical signal 390. The transfer function 510 also allows most (approximately 95 to 99% in this example) of the noise of the input optical signal 390 at the wavelengths 540 to be coupled to the output 340 for noise power measurements. As will be discussed in further detail below, the optical performance monitoring function 380 performs a determination of the OSNR of the input optical signal 390 using signal power of the tapped signal 315 detected at channel wavelengths 530 and using the noise power of the optical signal 315 at the wavelengths between the channel wavelengths. Adjustments are made to address the differing amount of signal vs. noise that is tapped, as detailed below. As discussed above, at the wavelengths 540 most of the noise power is coupled to the tapped signal 315, providing a noise level that is sufficiently higher than the noise floor of OPM 345 for an accurate measurement of the noise. Furthermore, the fact that the channel power is significantly attenuated relative to the noise power substantially addresses the crosstalk problem because very little channel power is inadvertently added to the noise power.

The curves of FIG. 5A can be used to determine adjustment terms such that the OSNR calculation for the tapped signal can be corrected to equal that of the signal prior to tapping. The adjustment for channel power measurements is determined from the attenuation that channel frequencies experience. For example, channel wavelength 531 undergoes an attenuation of about −17.8 dB and this should be added to the channel power measurement taken after the tap. Similarly, the noise measurement 533 adjacent the channel wavelength 531 undergoes an attenuation of approximately −0.7 dB, and this should be added to the noise power measurement taken after the tap. The attenuation can be frequency dependent in which case calibration terms for each wavelength should be measured. Alternatively, if there is an approximately constant attenuation profile, a smaller number of adjustment terms may be appropriate.

Noise in a given channel includes both white noise and spurious crosstalk from other channels. Noise measurement is ideally done in band but for practical reasons most measurements are done out of band in the vicinity of the channel under investigation without capturing very much if any of the channel power.

Figure 5B:
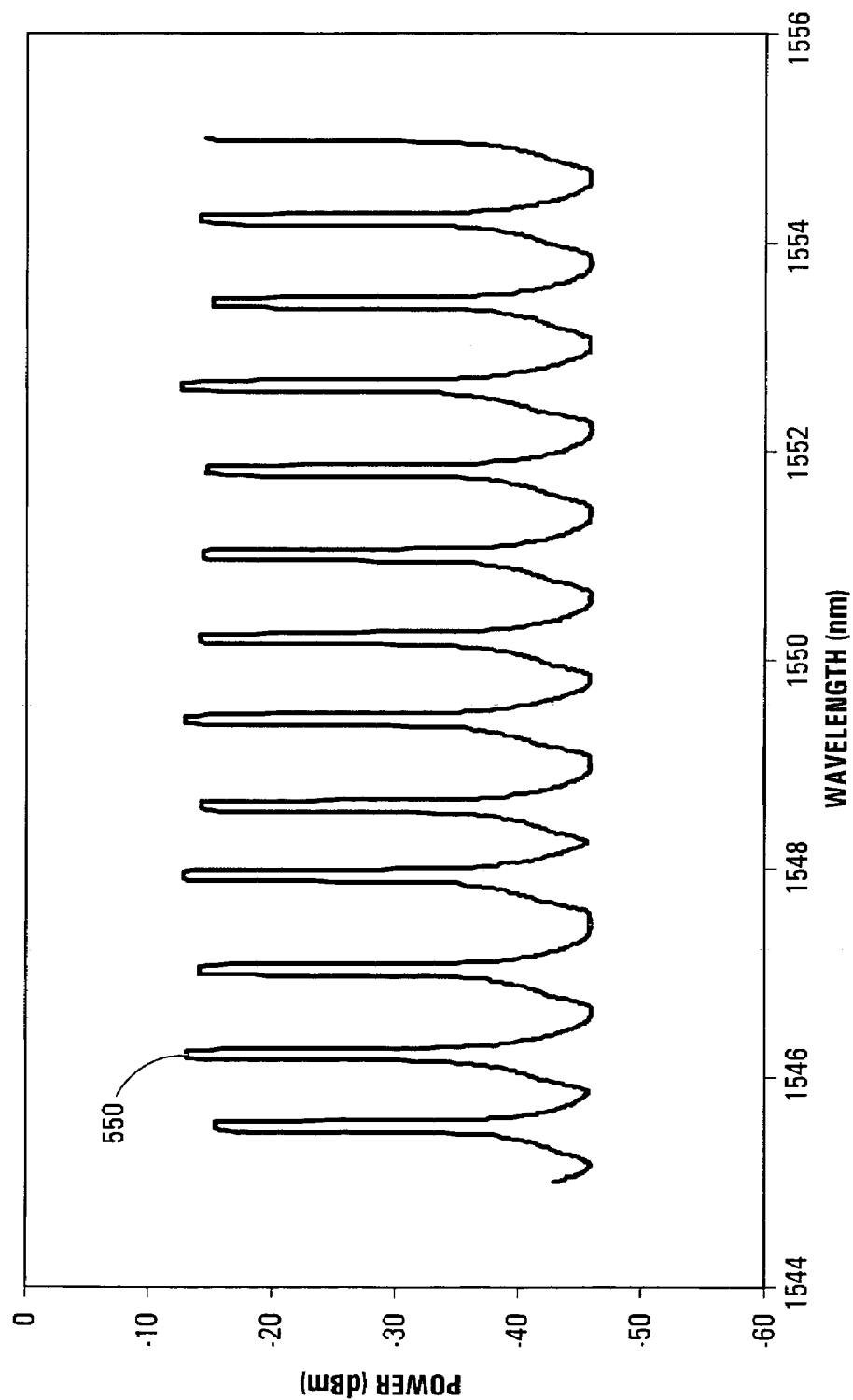
FIG. 5B is a graph of the power of an example input optical signal plotted as a function of wavelength, the input optical signal being input into the WDT of the arrangement of FIG. 3A.
Figure 5C:
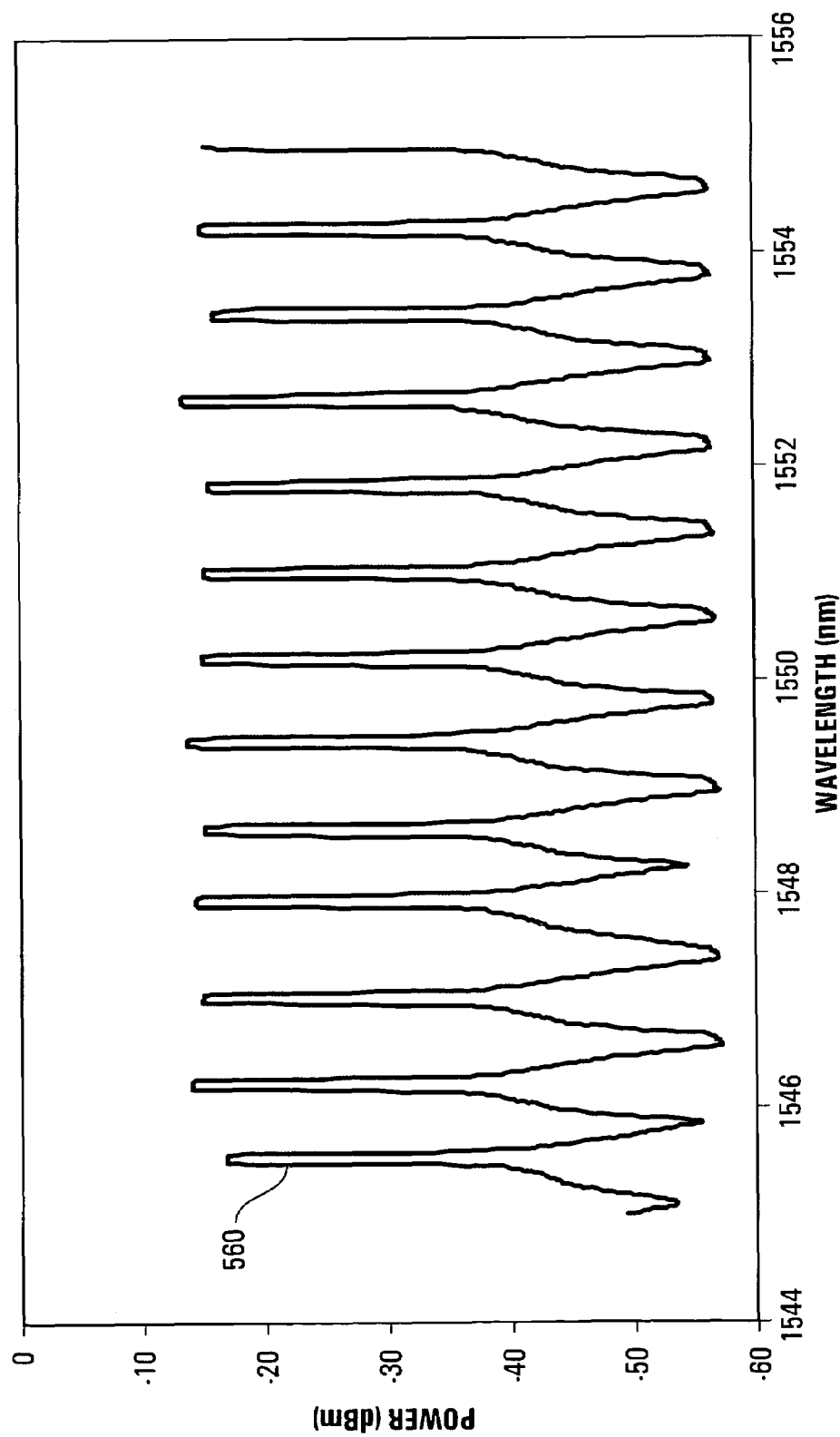
FIG. 5C is a graph of the power of an example through signal plotted as a function of wavelength, the through signal being output from the WDT of the arrangement of FIG. 3A.
Figure 5D:
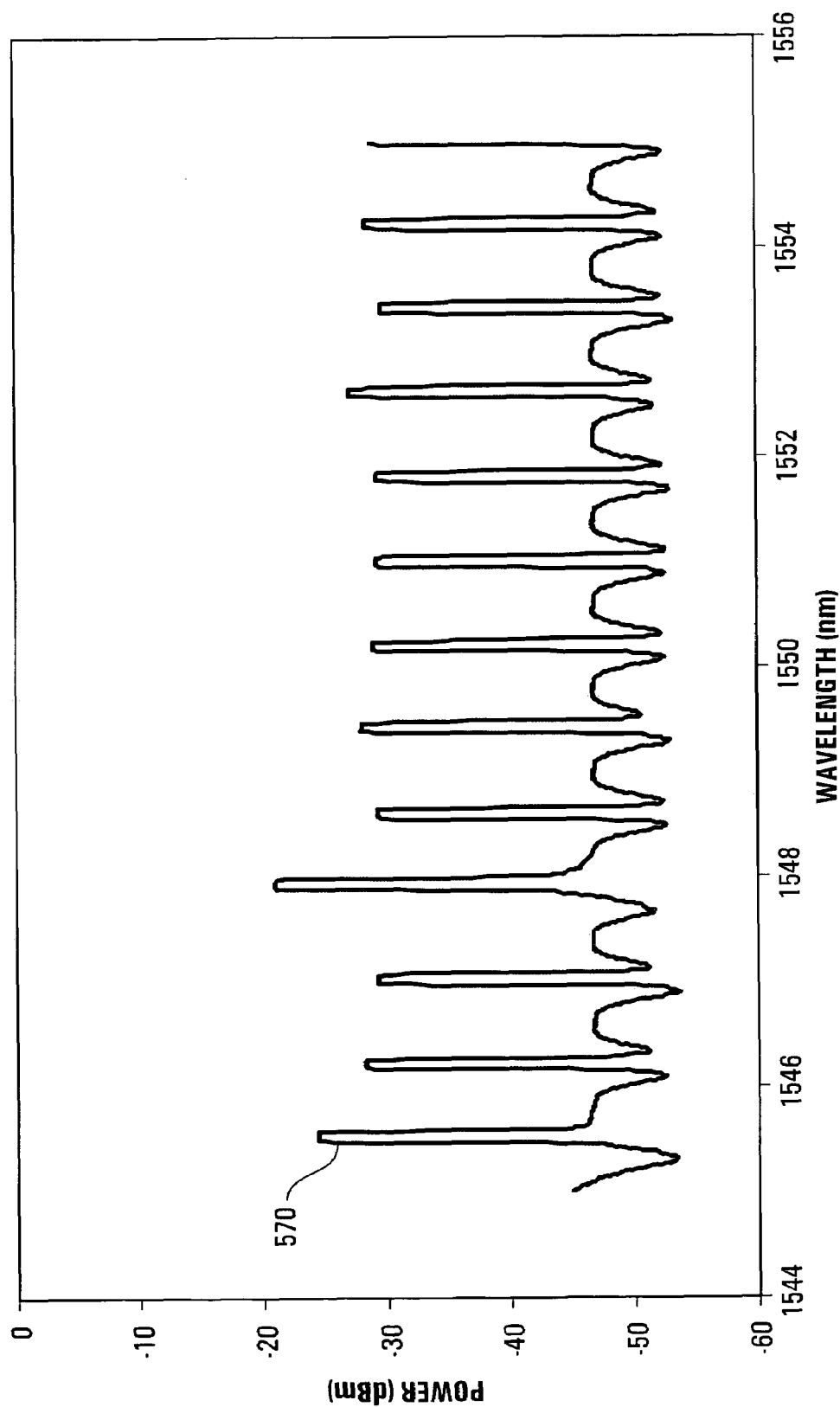
FIG. 5D is a graph of the power of an example tapped signal plotted as a function of wavelength, the tapped signal being output from the WDT of the arrangement of FIG. 3A.

The coupling effect of the WDT 310 can be seen in FIGS. 5B to 5D. In particular, in an example implementation the input optical signal 390 has a 100 GHz channel spacing and an OSNR of about 30 dB. In FIG. 5B, the power of the input optical signal 390 plotted as a function of wavelength is represented by curve 550, which shows a signal power of approximately −15 dBm and an average noise of approximately −45 dBm. An OSNR of 30 dB is too high for accurate measurement by conventional systems. The powers of the through signal 305 and the tapped signal 315 are plotted as a function of wavelength and represented by curves 560, 570, respectively, in FIGS. 5C and 5D. Curve 560 of through signal 305 shows an attenuation in signal power of about 0.7 dB and an attenuation of about 20 dB at wavelengths between channel wavelengths, in comparison with the power of input optical signal 390 represented by curve 550 of FIG. 5A. Curve 570 of tapped signal 315 shows a larger attenuation in signal power but almost no attenuation in noise at wavelengths between channel wavelengths, in comparison with the power of input optical signal 390 represented by curve 550 of FIG. 5A. The OSNR of the tapped signal 315 is approximately 15 dB and can be measured. As discussed above, the attenuation effects are measured in advance so that they can be compensated for.

As discussed above, in some implementations the performance characteristic of an optical signal that is monitored includes the OSNR of the optical signal. An example method of determining the OSNR of an optical signal using the arrangement 300 of FIG. 3A will now be described with reference to FIGS. 3A, 5A, and 6.

Figure 6:
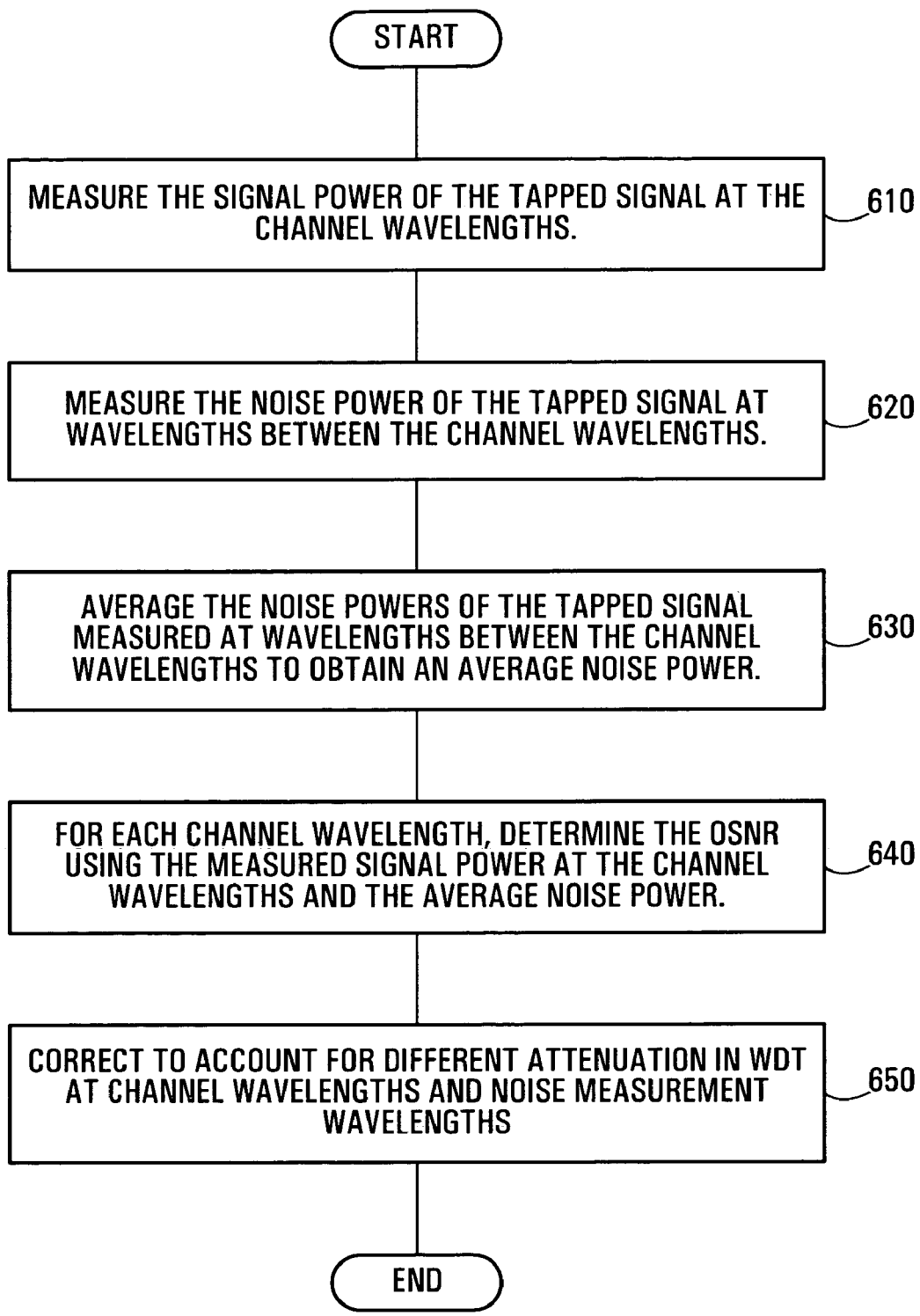
FIG. 6 is a flow chart of a method of determining OSNR, in accordance with another embodiment of the invention.

Referring to FIG. 6, shown is a method of determining the OSNR of an optical signal, in accordance with an embodiment of the invention. As an example, the optical signal for which the OSNR is determined corresponds to the input optical signal 390 of FIG. 3A, and the OSNR is determined using power measurements of tapped signal 315. In FIG. 6, at step 610 the signal power of tapped signal 315 is measured at the channel wavelengths 530. At step 620, the noise power of the tapped signal 315 is measured at the wavelengths 540 between the channel wavelengths 530. At step 630, the noise powers of the tapped signal 315 measured at the wavelengths 540 between the channel wavelengths 530 are averaged to obtain an average noise power. Preferably, a pair of noise power measurements on either side of a particular channel wavelength are averaged to obtain the average noise power for that wavelength. At step 640, an OSNR is determined for each of the channel wavelengths 530 using the measured signal power at the channel wavelength and the average noise power. The OSNR is given by $$OSNR = P_C - P_N,$$

where $P_C$ is the power in dBm at a particular channel wavelength and $P_N$ is the average noise power in dBm, both measured in a standard optical bandwidth of 0.1 nm.

At step 650 a correction is made to account for the attenuation of the tap coupler. In the example implementation, 1% of the power from the input optical signal 390 at the channel wavelengths 530 is coupled to the tapped signal 315 and a correction to the OSNR is made by adding $10 \log_{10}(100/1\%) = 20$ dB to the OSNR. Furthermore, in the example implementation 99% of the noise power from the input optical signal 390 at the wavelengths 540 is coupled to the tapped signal 315 and a correction to the OSNR is made by adding 10

$$\log_{10}\left(\frac{100}{99\%}\right) \cong 0.0044 \text{ dB}.$$

Preferably wavelength specific adjustments are measured and used to make the corrections. For example, the curves in FIG. 5A (or the equivalent curves measured for an active tap coupler) can be used to determine wavelength specific attenuation.

Figure 7A:
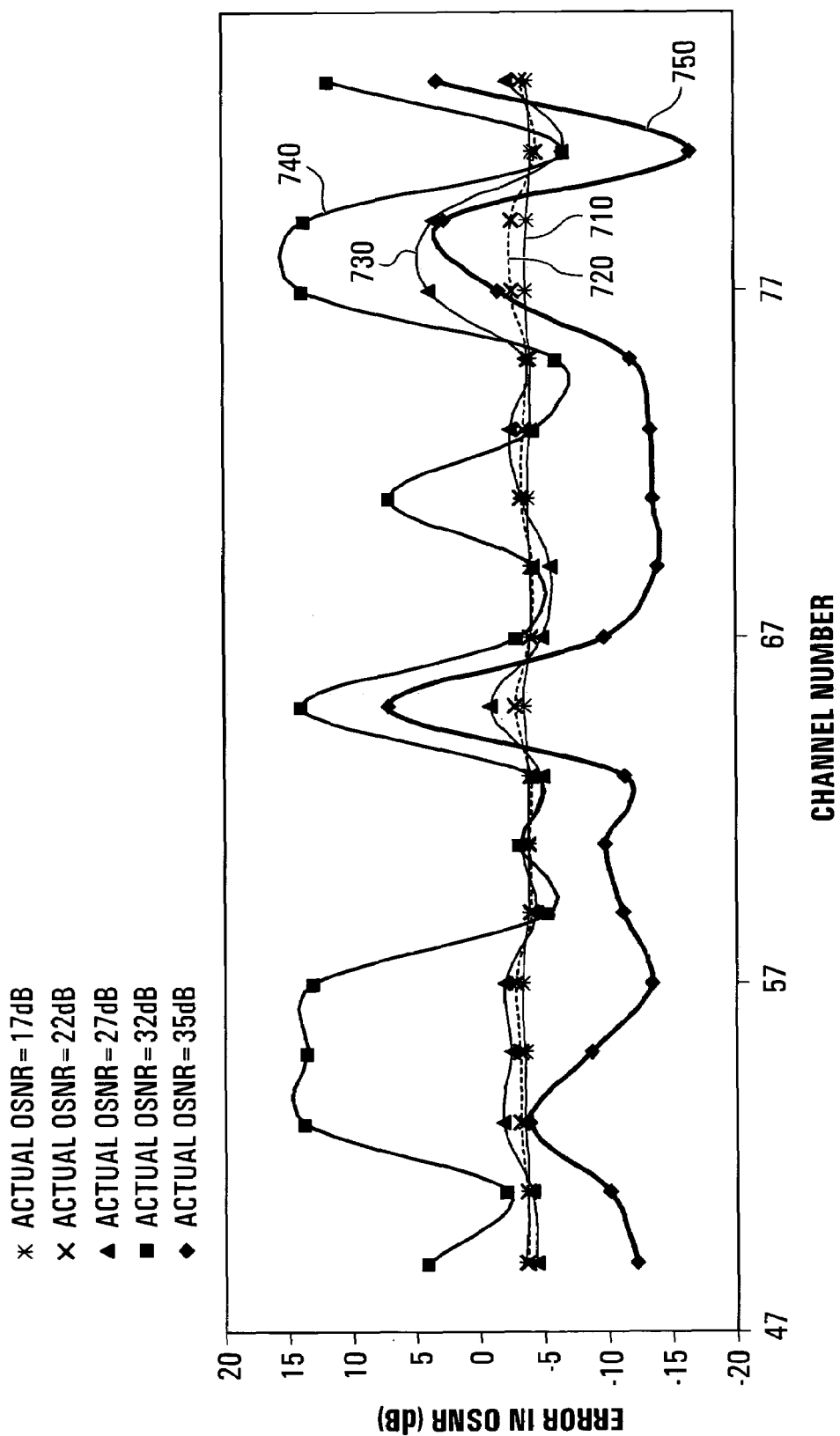
FIG. 7A is a graph of error in OSNR plotted as a function of channel number using the arrangement of FIG. 1.
Figure 7B:
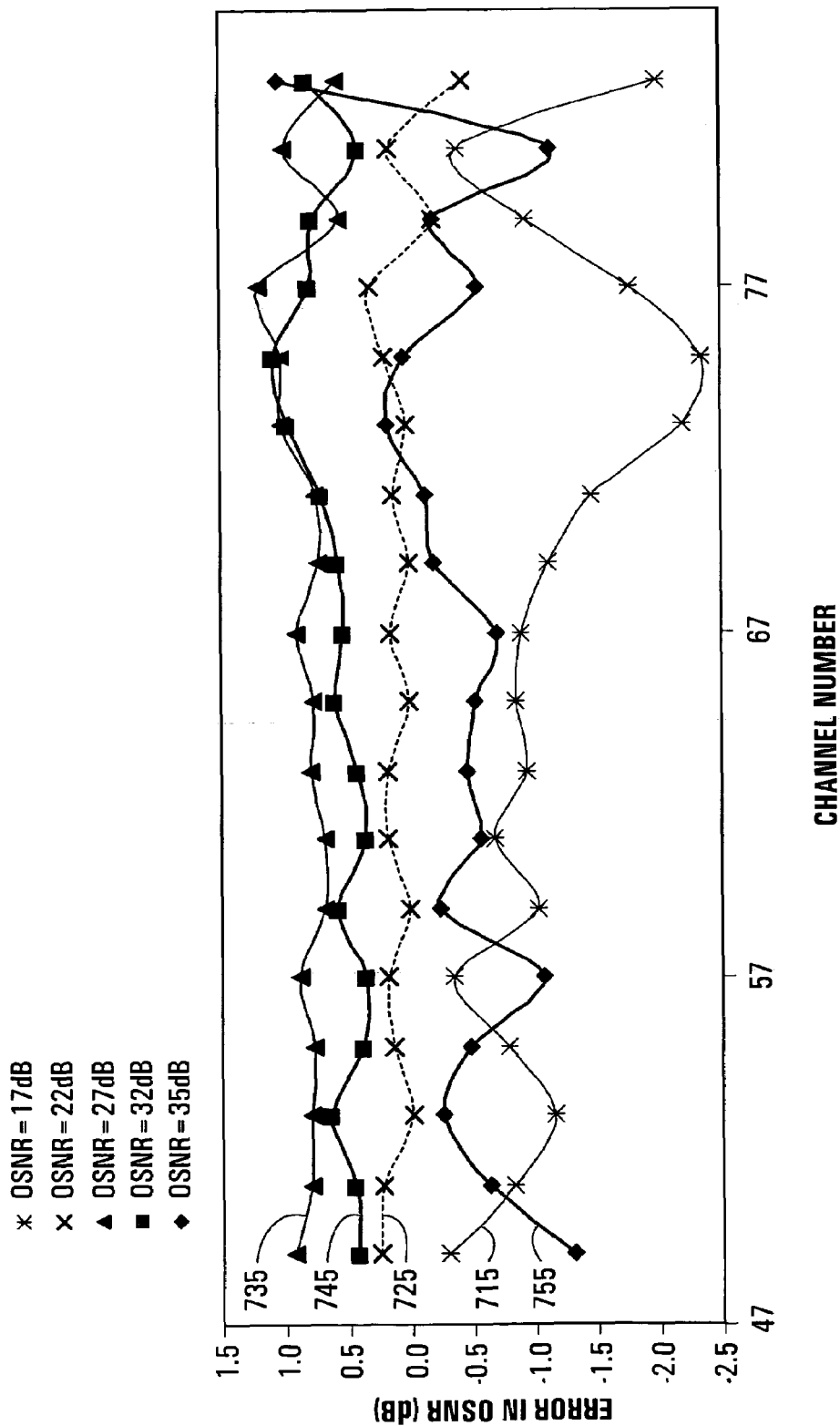
FIG. 7B is a graph of an error in OSNR plotted as a function of channel number using the arrangement of FIG. 3A.

Differences in accuracy between OSNR measurements from the conventional arrangement of FIG. 1 and the arrangement 300 of FIG. 3A will now be discussed with reference to FIGS. 7A and 7B. In FIG. 7A, an error in OSNR measured as a function of wavelength using the arrangement of FIG. 1 is plotted as a function of channel number. Curves 710, 720, 730, 740, 750 are plotted as a function of channel number for optical signals having OSNRs of 17, 22, 27, 32, and 35 dB, respectively as measured with an OSA. It is clear that all of the curves 710, 720, 730, 740, 750 show significant error in OSNR measurement, and in some cases the error is more than 15 dB. For example, curve 710 shows an ONSR error of approximately −4 dB on an OSNR of 17 dB. For curve 740, the maximum error is about 15 dB, on an actual OSNR of 35 dB. On the other hand, in FIG. 7B an error in OSNR is plotted as a function of channel number using the arrangement 300 of FIG. 3A. Curves 715, 725, 735, 745, 755 are plotted as a function of channel number for signals having OSNRs of 17, 22, 27, 32, and 35 dB, respectively. The curves 715, 725, 735, 745, 755 show a maximum error of ±1.5 dB for the majority of data points. It is clear that the arrangement 300 of FIG. 3A provides improved accuracy over the conventional arrangement of FIG. 1, which provides errors of 15 dB or even higher.

Figure 3A:
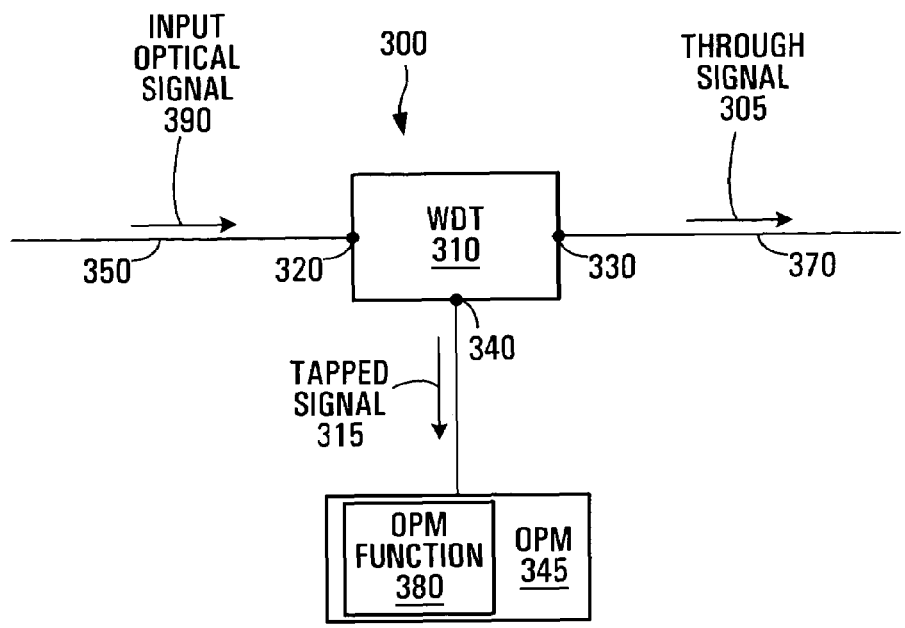
FIG. 3A is a block diagram of an arrangement for performing optical performance monitoring of an optical signal, in accordance with an embodiment of the invention.
Figure 3B:
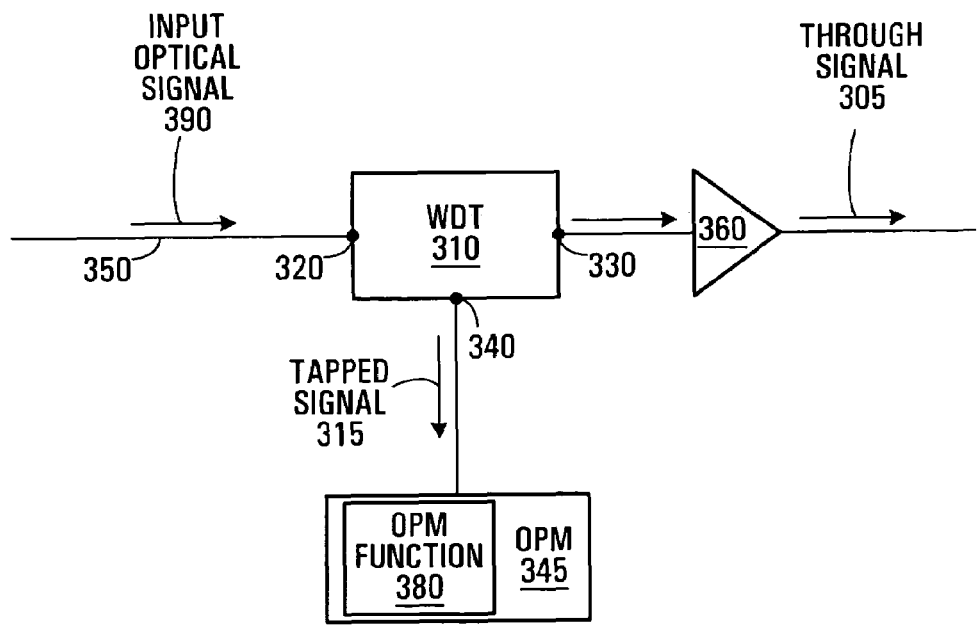
FIG. 3B is a block diagram of the arrangement of FIG. 3A in an optical communication system, in accordance with another embodiment of the invention.
Figure 3C:
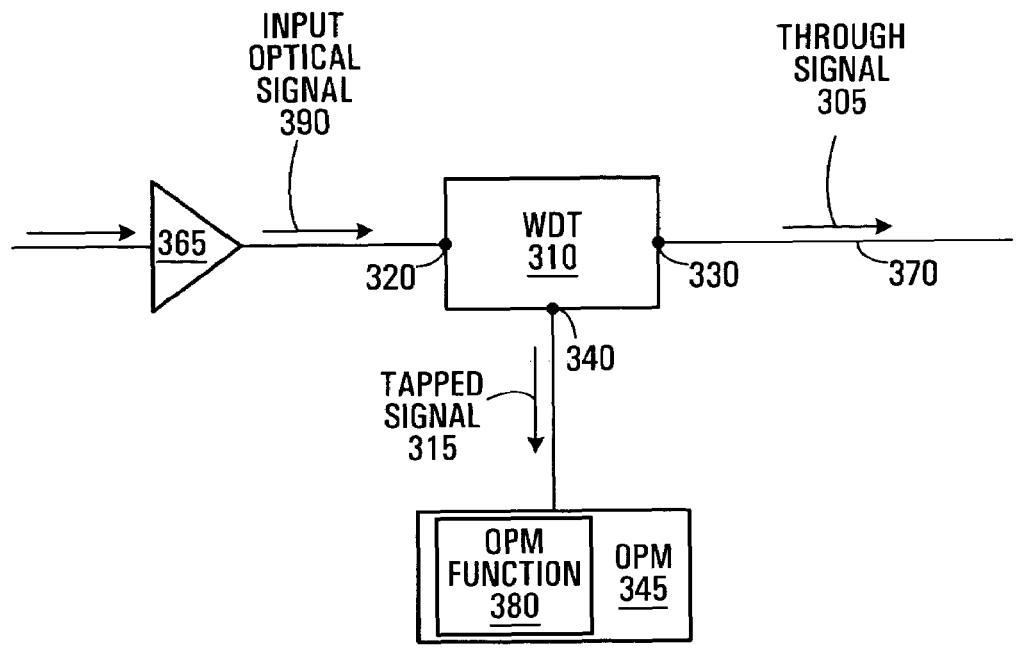
FIG. 3C is a block diagram of the arrangement of FIG. 3A arranged in a different way in an optical communication system, in accordance with another embodiment of the invention.
Figure 3D:
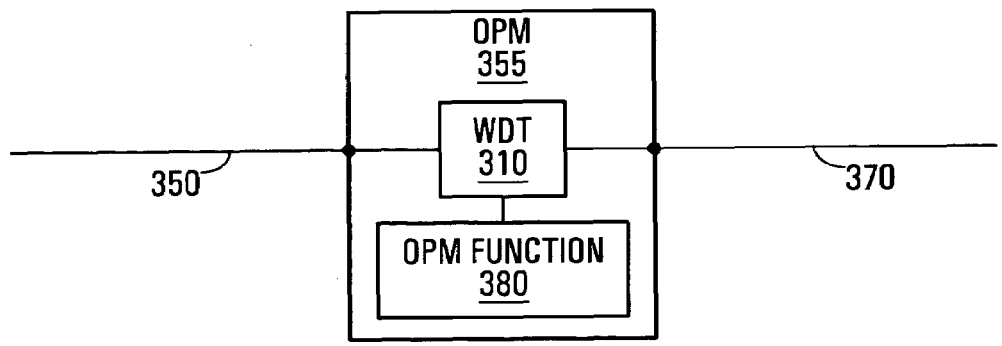
FIG. 3D is a block diagram of an optical performance monitor for performing optical performance monitoring of an optical signal, in accordance with another embodiment of the invention.
Figure 4:
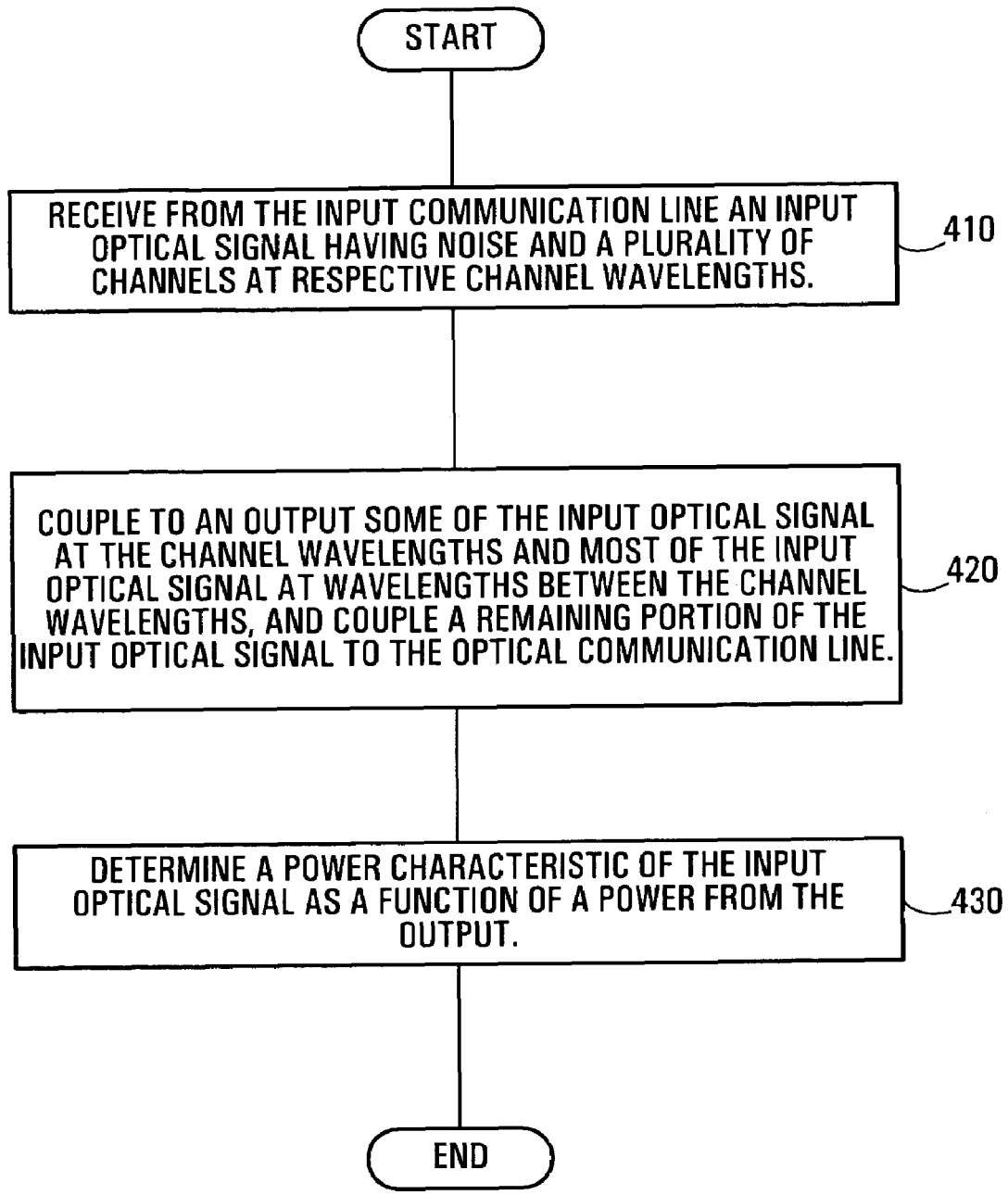
FIG. 4 is a flow chart of a method of performing optical performance monitoring of an input optical signal, in accordance with another embodiment of the invention.

Referring to FIG. 3A, in some embodiments of the invention the OPM 345 is a CPM (Channel Performance Monitor) having the optical performance monitoring function 380. Furthermore, in some embodiments of the invention the WDT 310 forms part of the OPM 345 or a CPM. For example, with reference to FIG. 3D, an OPM 355 has WDT 310 coupled to the input and output communication lines 350, 370 and has the optical performance monitoring function 380 coupled to the WDT 310.

In the above example implementation a 50 GHz interleaver is used as WDT 310. However, in some embodiments of the invention, other types of WDTs are used. For example, in some embodiments the WDT 310 is any suitable interleaver or any suitable interferometer, such as an etalon filter, a Fabry-Perot device, a Mach-Zehnder interferometer, a Michelson interferometer, a fibre Bragg grating or thin film filter for example. In some embodiments of the invention, the WDT 310 has two or more Fabry-Perot devices connected in series to provide a flat wavelength response in the signal power at channel wavelengths.

With reference to FIGS. 3A, 4, and 5A to 5D, in the example used to describe the method of FIG. 4 the channels of the optical signal 390 are separated by 100 GHz. However, it is to be clearly understood that in some implementations the separation between channels is more or less than 100 GHz. Furthermore, embodiments of the invention are not limited to performing optical performance monitoring on DWDM (Dense Wavelength Division Multiplexed) optical signals, and the methods described above can be applied to any suitable optical signal. In addition, with reference to FIGS. 3A and 5A in the example implementation 95-99% of the noise power of the input optical signal 390 at wavelengths 540 between the channel wavelengths 530 is coupled to the output 340. However, it is to be clearly understood that more or less of the noise power at the wavelengths 540 may be coupled to the output 340 and the amount coupled may be somewhat wavelength dependent. Similarly, in the example implementation 1 to 2% of the power of the input optical signal 390 at the channel wavelengths 530 is coupled to the output 340. However, it is to be clearly understood that more or less of the power at the channel wavelengths 530 is coupled to the output 340 and the amount coupled may be somewhat wavelength dependent.

The transfer functions 510, 520 of FIG. 5A are selected to allow a sufficient amount of the noise power of the input optical signal 390 to be coupled to the output 340 to produce a noise level in the tapped signal 315, which is higher than the noise floor of the OPM 345, typically −45 to −50 dBm.

In FIG. 5A, the transfer functions 510, 520 are shown for a particular WDT. However, it is to be clearly understood that the transfer functions 510, 520 will vary depending on the type of WDT being used. For example, in FIG. 5A the wavelengths 540 are centered between the channel wavelengths 530. In some embodiments of the invention, other wavenlengths that are between the channel wavelengths 530 and used to measure noise power, are not centered between the channel wavelengths 530. Furthermore, the transfer functions 510, 520 of FIG. 5A are described above as separate entities independent of one another. However, in some implementations the two transfer functions 510, 520 are linked to one another so that at any particular wavelength the transfer function 520 is related to the transfer function 510.

It is to be clearly understood that embodiments of the invention are not limited to the above-described methods. For example, as discussed above the arrangement 330 is used to perform optical performance monitoring by determining a power characteristic of input optical signal 390 using a power measurement of the tapped signal 315. An example power characteristic is an OSNR, and a method of determining OSNR is described above with reference to FIG. 6, where the power measurements include signal power measurements and noise power measurements. However, it is to be clearly understood that other power characteristics can be determined and other power measurements can be made. For example, in some implementations the power characteristic is a noise power of input optical signal 390 and the power measurement is a noise power measurement of tapped signal 315.

Furthermore, with reference to FIG. 6, in determining OSNR, signal power is measured for a number of channel wavelengths at step 610. More generally, the OSNR is determined for one or more channel wavelengths. At step 620, the average noise is measured at wavelengths adjacent to the channel wavelength and then at step 630 the noise is averaged over both measurements. More generally, for purposes of averaging, a sample from two or more wavelengths is preferably used but a single noise measurement near the channel wavelength may suffice. In some cases the noise is not a constant function of wavelength, and for a particular channel the noise is estimated using an average from a subset of noise powers at wavelengths in the vicinity of the channel wavelength of the particular channel.

Regarding step 650, with reference to FIG. 3A in the example implementation, corrections for differences between the input optical signal 390 and the tapped signal 315 are made by applying a correction term that compensates for differences in the attenuation at channel and noise measurement wavelengths. Noise attenuation in the WDT may be insignificant. As such, in some implementations there is no need to make a correction to the noise power measurement.

Numerous modifications and variations of the present invention are possible in light of the above teachings. It is therefore to be understood that within the scope of the appended claims, the invention may be practised otherwise than as specifically described herein.

We claim:

1. Arrangement comprising:
   a WDT (wavelength-dependent tap) configured to recieve an input optical signal having noise and a plurality of channels at respective channel wavelengths, the WDT having a first output and a second output and being configured to:
   i) couple to the first output some of the input optical signal at the channel wavelengths and most of the input optical signal at wavelengths between the channel wavelengths; and
   ii) couple a remaining portion of the input optical signal to the second output; wherein the remaining portion of the input optical signal comprises most of the input optical signal at the channel wavelengths; and
   an optical performance monitoring function configured to determine an OSNR (Optical Signal-to-Noise Ratio) of the input optical signal as a function of:
   a first power from the first output of at least one channel wavelength of the channel wavelengths, the first power approximating channel power at the at least one channel wavelength of the channel wavelengths; and
   a second power from the first output of at least one wavelength that is between the channel wavelengths, the second power approximating noise power at the at least one wavelength that is between the channel wavelengths.

2. The arrangement according to claim 1, wherein the at least one wavelength comprises at least one wavelength in the vicinity of each channel wavelength.

3. An arrangement according to claim 1, wherein the channels of the input optical signal are separated by 100 GHz, and wherein the WDT is a 50 GHz interleaver for coupling to the second output most of the power of the input optical signal at the channel wavelengths of all of the plurality of channels.

4. An arrangement according to claim 1, wherein the WDT comprises a periodic transfer function from an input configured to receive the input optical signal to the first output, wherein the periodic transfer function has valleys at the channel wavelengths and peaks between the channel wavelengths.

5. An arrangement according to claim 1, wherein the at least one channel wavelength comprises a plurality of channel wavelengths and wherein the at least one wavelength between the channel wavelengths comprises a plurality of wavelengths.

6. An arrangement according to claim 5, wherein for each channel wavelength the optical performance monitoring function is configured to determine a respective average of the noise power using a set of adjacent wavelengths in the vicinity of the channel wavelength for determining the OSNR at the channel wavelength.

7. An arrangement according to claim 1, wherein to determine the OSNR the optical performance monitoring function is configured to take into account differences in attenuation in the WDT at the channel wavelengths compared to wavelengths used to measure noise power.

8. An arrangement according to claim 7, wherein to correct for differences in attenuation in the WDT at channel wavelengths compared to wavelengths used to measure noise power the optical performance monitoring function is configured to apply an adjustment to each channel wavelength power measurement that approximates the attenuation in the WDT at that wavelength, and to apply an amount to each noise power measurement that approximates the attenuation in the WDT at the wavelength used for the noise power measurement.

9. An arrangement according to claim 1, wherein the WDT comprises a periodic transfer function configured to allow a sufficient amount of the noise power of the input optical signal at the at least one wavelength between the channel wavelengths to be coupled to the first output in order to produce a measurable noise level relative to a noise floor of the optical performance monitoring function.

10. An arrangement according to claim 1, wherein the WDT is one of an interleaver, an etalon filter, a Fabry-Perot device, a Mach-Zehnder interferometer, and a Michelson interferometer, fibre Bragg grating and thin film filter.

11. The arrangement of claim 1 comprising: an OPM (Optical Performance Monitor), the WDT and the optical performance monitoring function forming part of the OPM.

12. The arrangement of claim 1 comprising: a CPM (Channel Performance Monitor), the WDT and the optical performance monitoring function forming part of the CPM.

13. An arrangement according to claim 1, wherein the input optical signal is a DWDM (Dense Wavelength-Division Multiplexed) optical signal.

14. The arrangement of claim 1 comprising: an optical communication system comprising an output optical communication line coupled to the WTD configured to direct the input optical signal into the WTD and an output optical communication line coupled to the WTD at the second output, the WTD and the optical performance monitoring function forming part of the optical communication system.

15. An optical communication system comprising:
an input optical communication line;
an output optical communication line; and
the arrangement of claim 1;
the WDT (wavelength-Dependent Tap) being coupled to the input optical communication line configured to receive from the input optical communication line the input optical signal having noise and a plurality of channels at respective channel wavelengths, the WDT being coupled to the output optical, communication line at the second output configured to transmit the remaining portion of the input optical signal to the output optical communication line.

16. The arrangement of claim 4, wherein the WDT comprises a second periodic transfer function from the input configured to receive the input optical signal to the second output, wherein the second periodic transfer function has peaks at the channel wavelengths and valleys between the channel wavelengths.

* * * * *